United States Patent [19]

Sekioka et al.

[11] Patent Number: 5,114,431
[45] Date of Patent: May 19, 1992

[54] DISPERSE DYE MIXTURE: TWO RED DISPERSE DYES FOR POLYESTER FIBERS-AZO DYES CONTAINING NAPHTHALIC IMIDE COUPLER

[75] Inventors: Riyouichi Sekioka; Kouichi Seto, both of Kitakyushu, Japan

[73] Assignee: Hoechst Mitsubishi Kasei Co., Ltd., Tokyo, Japan

[21] Appl. No.: 654,055

[22] Filed: Feb. 12, 1991

[30] Foreign Application Priority Data

Feb. 15, 1990 [JP] Japan .................................. 2-34732

[51] Int. Cl.$^5$ ...................... C09B 29/15; C09B 67/22; D06P 1/18; D06P 3/54
[52] U.S. Cl. ............................................ 8/639; 8/532; 8/533; 8/662; 8/922; 534/789
[58] Field of Search .............................................. 8/639

[56] References Cited

U.S. PATENT DOCUMENTS 4,057,539 11/1977 Imahori et al. ...................... 534/789
4,235,598 11/1980 Reel et al. ................................ 8/584

*Primary Examiner*—A. Lionel Clingman
*Attorney, Agent, or Firm*—Oblon, Spivak, McClelland, Maier & Neustadt

[57] ABSTRACT

A disperse dye mixture comprising a red disperse dye of the following formula (A):

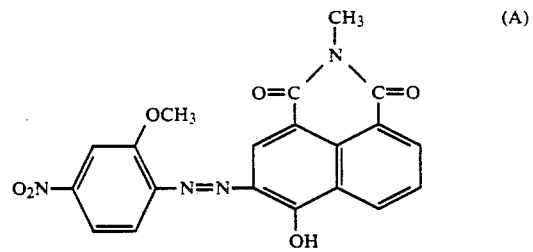

and at least one red disperse dye of the following formula (B):

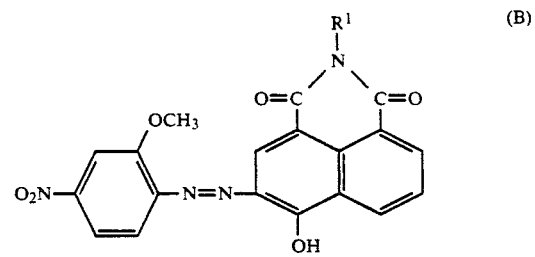

wherein $R^1$ is $C_2$–$C_4$ alkyl, $C_1$–$C_4$ alkoxy $C_2$–$C_3$ alkyl or $C_1$–$C_4$ alkoxyethoxyethyl, in a weight ratio of (B)/(A) of from 0.1 to 5.

10 Claims, No Drawings

DISPERSE DYE MIXTURE: TWO RED DISPERSE DYES FOR POLYESTER FIBERS-AZO DYES CONTAINING NAPHTHALIC IMIDE COUPLER

The present invention relates to a disperse dye mixture. More particularly, it relates to a red disperse dye mixture which is excellent not only in the wet fastness but also in the dyeing affinity and temperature dependency at the time of dyeing.

Red disperse dyes of the following formula (I):

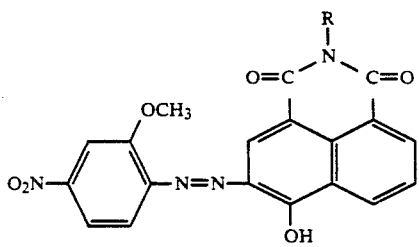

wherein R is alkyl, alkoxyalkyl or alkoxyalkoxyalkyl, are known as dyes excellent in the wet fastness when used for dyeing polyester fibers (U.S. Pat. No. 4,057,539).

It is an object of the present invention to provide a dye having the properties of such disperse dyes, such as the dyeing affinity, temperature dependency and high temperature dispersibility at the time of dyeing, further improved.

The present inventors have found that when red disperse dyes of the above formula (I) are used in a specific combination, the dyeing affinity, temperature dependency and high temperature dispersibility can be improved while maintaining the excellent wet fastness. The present invention has been accomplished on the basis of this discovery.

Namely, the present invention provides a disperse dye mixture comprising a red disperse dye of the following formula (A):

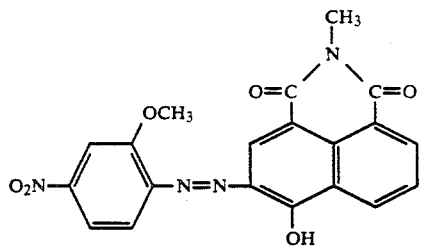

and at least one red disperse dye of the following formula (B):

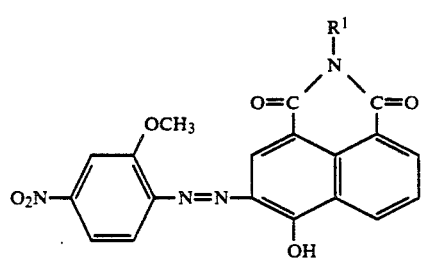

wherein $R^1$ is $C_2$-$C_4$ alkyl, $C_1$-$C_4$ alkoxy $C_2$-$C_3$ alkyl or $C_1$-$C_4$ alkoxyethoxyethyl, in a weight ratio of (B)/(A) of from 0.1 to 5.

Now, the present invention will be described in detail.

In the present invention, the same types of red disperse dyes of the above formulas (A) and (B) are used in combination. The blending ratio is such that component (B) is from 0.1 to 5 times by weight, preferably from 0.2 to 4 times by weight, more preferably from 0.3 to 2 times by weight, relative to component (A). If the amount of component (B) is too small or too large, the effects for improving the dyeing affinity and the temperature dependency will be small.

In the above formula (B), the $C_2$-$C_4$ alkyl for $R^1$ includes, for example, ethyl, n-propyl, iso-propyl, n-butyl and iso-butyl; the $C_1$-$C_4$ alkoxy $C_2$-$C_3$ alkyl includes, for example, methoxyethyl, ethoxyethyl, n-propoxypropyl; methoxypropyl, ethoxypropyl and n-propoxypropyl; and the $C_1$-$C_4$ alkoxyethoxyethyl includes, for example, methoxyethoxyethyl, ethoxyethoxyethyl and n-propoxyethoxyethyl. In the present invention, particularly preferred effects can be obtained when $R^1$ is ethyl. The dyes of the above formula (B) may be used alone or in combination as a mixture of two or more. When they are used in combination, the ratio of the respective dyes can optionally be selected.

The dyes of the formulas (A) and (B) include novel dyes and can be prepared according to a conventional method such as the one disclosed in U.S. Pat. No. 4,057,539 even in the case of such novel dyes.

For example, they can be prepared by a method which comprises diazotizing an aniline derivative of the following structural formula (II):

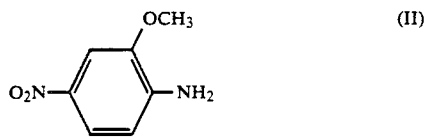

and coupling the diazotized products with an oxynaphthalic acid derivative of the following formula (III):

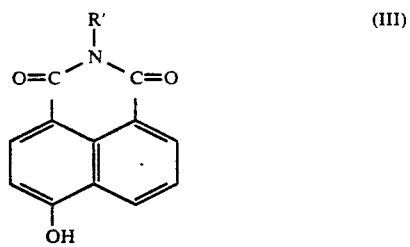

wherein R' is methyl or a group defined by $R^1$.

In the present invention, the above-mentioned same types of at least two disperse dyes are used in combination as the red components. However, other red dyes may be used in combination, as the case requires. Further, in order to obtain a desired color by dyeing fibers, a blue component and a yellow component may be incorporated.

When the disperse dye mixture of the present invention is to be used, it is necessary to mix it with a known anion dispersing agent such as a naphthalene sulfonic acid-formalin condensation product or a sodium salt of lignin sulfonic acid and subjecting the resulting dye cake to disperse treatment to obtain a disperse dye composition, in accordance with a conventional method.

The disperse dye mixture of the present invention is used primarily for dyeing polyester fibers. The polyester fibers to be dyed may be alone or in admixture with other fibers.

The dye mixture of the present invention may be used for various dyeing methods. However, it shows particularly excellent dyeing affinity and temperature dependency as well as high temperature dispersibility when applied to exhaustion dyeing. There is no particular restriction as to the dyeing conditions for the exhaustion dyeing. For example, the dyeing temperature may be from 120° to 140° C., and the dyeing bath may have a pH of from 4 to 9.5.

The dye mixture of the present invention having combined specific disperse dyes, has good dispersibility and is excellent in the dyeing affinity and temperature dependency at the time of dyeing and provides a red dyed product having excellent wet fastness.

Now, the present invention will be described in further detail with reference to Examples. However, it should be understood that the present invention is by no means restricted to such specific Examples.

EXAMPLES 1 to 4 and COMPARATIVE EXAMPLES 1 to 4

To 27 g of a dye mixture obtained by mixing two disperse dyes (a) and (b) having different groups for R in the structural formula as identified in the following Table 1 in a weight ratio of 50:50, 36 g of a sodium salt of lignin sulfonic acid, 37 g of a naphthalene sulfonic acid-formalin condensation product and 300 g of water were added, and the resulting mixture was wet-pulverized by a sand grinder for 5 hours and then spray-dried by a conventional method to obtain a powdery dye composition.

To 0.11 g of this dye composition, acetic acid, ammonium sulfate, a nonionic dispersing agent (manufactured by Nicca Chemical Co., Ltd., tradename: NICCA SUNSOLT 7000) and water were added in such amounts as to bring the respective concentrations to 0.03 ml/l of acetic acid, 2 g/l of ammonium sulfate and 0.5 g/l of the nonionic dispersing agent to obtain a dyeing bath in a total amount of 150 ml. To this bath, 5 g of a polyester (tropical) loth was immersed and dyed at 130° C. for 60 minutes. Then, the dyed cloth was washed with water, subjected to reduction cleaning (i.e. treated with 150 ml of a solution containing 2 g/l of sodium hydrosulfite, 2 g/l of NaOH and 2 g/l of a surfactant (manufactured by Hoechst AG., tradename: HOSTAPAL LFB conc) at 80° C. for 10 minutes), washed with water and then dried. With respect to the resulting red-dyed cloth, the washing fastness and degree of exhaustion were measured, and the temperature dependency and high temperature dispersibility of the dye were examined. The results are shown in Table 1.

TABLE 1

$$\text{structure with } O_2N\text{-phenyl(OCH}_3\text{)-N=N-naphthalene(OH) with imide group containing R}$$

| | R | | Washing fastness *1) (grade) | Degree of exhaustion *2) (%) | Temperature dependency *3) (%) | High temperature dispersibility *4) |
|---|---|---|---|---|---|---|
| | (a) | (b) | | | | |
| Example 1 | —CH$_3$ | —C$_2$H$_5$ | 4 | 90 | 70 | Good |
| Example 2 | —CH$_3$ | —C$_3$H$_7^{(n)}$ | 4 | 70 | 50 | Fair |
| Example 3 | —CH$_3$ | —C$_3$H$_6$OCH$_3$ | 4 | 80 | 50 | Fair |
| Example 4 | —CH$_3$ | —C$_2$H$_4$OC$_2$H$_4$—OC$_2$H$_5$ | 4 | 80 | 65 | Fair |
| Comparative Example 1 | —CH$_3$ | Not used | 4 | 50 | 40 | Inferior |
| Comparative Example 2 | Not used | —C$_2$H$_5$ | 4 | 30 | 30 | Inferior |
| Comparative Example 3 | —C$_2$H$_5$ | —C$_3$H$_7^{(n)}$ | 4 | 50 | 45 | Slightly inferior |
| Comparative Example 4 | Not used | —C$_2$H$_4$OC$_2$H$_4$—OC$_2$H$_5$ | 4 | 50 | 40 | Inferior |

*1) Washing fastness: The dyed cloth was heat-set at 180° C. for one minute, and then the washing fastness (nylon stain) was measured in accordance with AATCC method II-A. *2) Degree of exhaustion: The dye in the dyed cloth was extracted with dimethylformamide, and the degree of exhaustion was calculated from the extracted amount and the amount of the dye used for dyeing. *3) Temperature dependency: The color density of the cloth dyed at 130° C. for 60 minutes was evaluated to be 100, and the color desity of the cloth dyed under the same conditions except that the dyeing temperature was changed to 120° C. was shown by a relative value. The measurement of the color density was obtained as a K/S value from the reflectance of the dyed specimen measured by a spectrophotometer (manufactured by Macbeth Co., tradename: MS-2020 plus). *4) High temperature dispersibility: A Dye-O-Meter test (dyeing test in which a fiber strand to be dyed is fixed in a closed dyeing container, and a dye solution is forcibly circulated in the direction of the fibers in the fiber strand) was conducted under the following conditions, and the degree of formation of tar-like substance deposited on the fiber strand was observed and evaluated. Material: Polyester. top (Fiber strand.) Amount of the dye: 4.4% o.w.f. Dyeing bath ratio: 1:25 (250 ml) pH: 5 Packing density of polyester. top: 0.31 g/cm$^3$ EXAMPLES 5 to 7

Tests were conducted in the same manner as in Example 1 except that the blending proportions of components (a) and (b) were changed as shown in Table 2. The results thereby obtained are shown in Table 2.

TABLE 2

|  | (a)/(b) | Washing fastness (grade) | Degree of exhaustion (%) | Temperature dependency (%) |
| --- | --- | --- | --- | --- |
| Example 5 | 20/80 | 4 | 90 | 65 |
| Example 6 | 40/60 | 4 | 90 | 70 |
| Example 7 | 80/20 | 4 | 85 | 65 |

We claim:

1. A disperse dye mixture comprising a red disperse dye of the following formula (A):

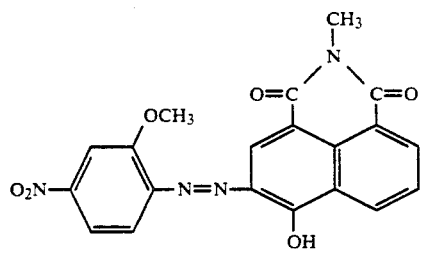

and at least one red disperse dye of the following formula (B):

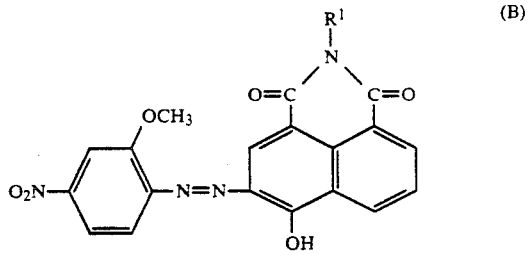

wherein $R^1$ is $C_2$-$C_4$ alkyl, $C_1$-$C_4$ alkoxy $C_2$-$C_3$ alkyl or $C_1$-$C_4$ alkoxyethoxyethyl, in a weight ratio of (B)/(A) of from 0.1 to 5.

2. The disperse dye mixture according to claim 1, wherein $R^1$ in the formula (B) is $C_2$-$C_4$ alkyl.

3. The disperse dye mixture according to claim 1, wherein $R^1$ in the formula (B) is $C_1$-$C_4$ alkoxy $C_2$-$C_3$ alkyl.

4. The disperse dye mixture according to claim 1, wherein $R^1$ in the formula (B) is $C_1$-$C_4$ alkoxyethoxyethyl.

5. The disperse dye mixture according to claim 1, wherein $R^1$ in the formula (B) is at least one member selected from the group consisting of ethyl, propyl, methoxypropyl and ethoxyethoxyethyl.

6. The disperse dye mixture according to claim 1, wherein $R^1$ in the formula (B) is ethyl.

7. The disperse dye mixture according to claim 1, wherein the weight ratio of (B)/(A) is from 0.2 to 4.

8. The disperse dye mixture according to claim 1, wherein the weight ratio of (B)/(A) is from 0.3 to 2.

9. The disperse dye mixture according to claim 1, wherein $R^1$ in the formula (B) is ethyl, and the weight ratio of (B)/(A) is from 0.3 to 2.

10. The disperse dye mixture according to claim 1, which is for dyeing polyester fibers alone or in admixture with other fibers.

* * * * *